(12) United States Patent
Efflandt, Sr.

(10) Patent No.: US 6,588,786 B2
(45) Date of Patent: Jul. 8, 2003

(54) CHAIN DRIVEN FRONT WHEEL DRIVE AND REAR WHEEL STEERING BICYCLE

(76) Inventor: Darrold Efflandt, Sr., 617 Virginia St., El Segunda, CA (US) 90245

( * ) Notice: Subject to any disclaimer, the term of this patent is extended or adjusted under 35 U.S.C. 154(b) by 0 days.

(21) Appl. No.: 09/938,693

(22) Filed: Aug. 24, 2001

(65) Prior Publication Data

US 2003/0038448 A1 Feb. 27, 2003

(51) Int. Cl.[7] .............................. B62K 5/04; B62M 1/02
(52) U.S. Cl. ........................................ 280/261; 280/270
(58) Field of Search ................................ 280/230, 259, 280/260, 261, 270, 274, 263

(56) References Cited

U.S. PATENT DOCUMENTS

| | | | | | |
|---|---|---|---|---|---|
| 522,908 | A | * | 7/1894 | Libbey | 280/202 |
| 592,122 | A | * | 10/1897 | Phelps | 280/270 |
| 2,182,345 | A | * | 12/1939 | Mieher | 280/238 |
| 4,925,202 | A | * | 5/1990 | Barker | 280/261 |
| 5,042,608 | A | * | 8/1991 | Horiike et al. | 180/219 |
| 5,351,979 | A | * | 10/1994 | Langen | 280/254 |
| 5,485,893 | A | * | 1/1996 | Summers | 180/219 |

* cited by examiner

*Primary Examiner*—Kevin Hurley
(74) *Attorney, Agent, or Firm*—Golstein & Lavas, P.C.

(57) ABSTRACT

A bicycle having front wheel drive and rear wheel steering, having a frame, a front wheel, handlebars, and a rear wheel. A rear steering assembly allows the rear wheel to be pivoted by a rear pulley assembly. A front steering assembly includes a front pulley assembly connected to the handlebars so that when the handlebars are pivoted the front pulley assembly is rotated. A left and right cable connect the front pulley assembly and rear pulley assembly so that when the handlebars are pivoted the rear wheel is pivoted in response. A driven sprocket is attached to the front wheel which is linked to a drive sprocket by a chain. A rotary power source such as human driven pedals or an engine is attached to the drive sprocket so that the front wheel is driven.

13 Claims, 4 Drawing Sheets

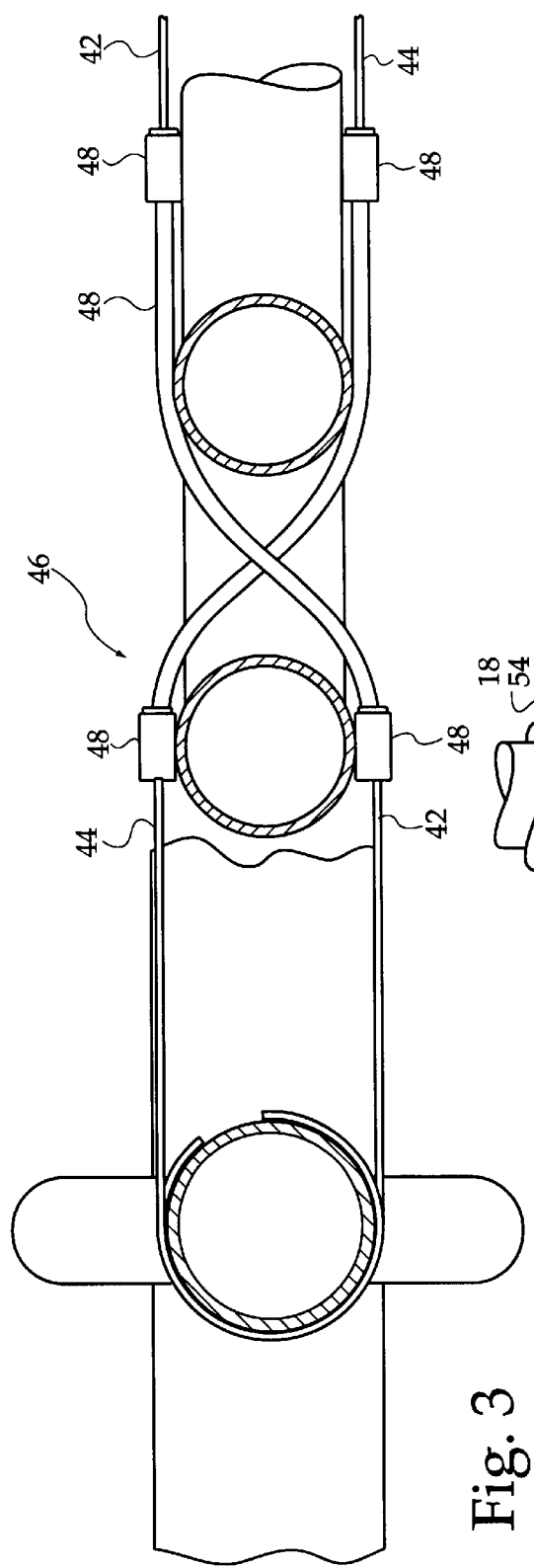
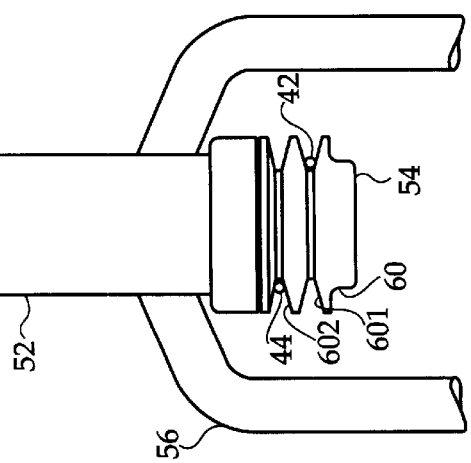
Fig. 3
Fig. 4

CHAIN DRIVEN FRONT WHEEL DRIVE AND REAR WHEEL STEERING BICYCLE

BACKGROUND OF THE INVENTION

The invention relates to a chain driven front wheel drive and rear wheel steering bicycle. More particularly, the invention relates to a two wheeled vehicle wherein pedal or engine power is used to drive a fixed front wheel, and wherein steering of the vehicle is accomplished by pivoting the rear wheel.

By definition, a bicycle is a two wheel vehicle. Conventionally, a bicycle includes a frame, and two similarly sized wheels, which are inline with each other and with the frame. Pedals protrude to either side of the frame, which allow the rider to power the vehicle by means of a chain and sprocket arrangement, which links the pedals to the rear wheel. "Handlebars" give the rider a firm hand-hold and allow the rider to steer the front wheel, which is generally located directly below the handlebars, and which is directly connected with the handlebars so that pivoting the handlebars also pivots the front wheel.

This arrangement is the most familiar configuration of a bicycle. It provides satisfactory transportation for the masses and in fact, literally billions of bicycles are in use worldwide. Virtually interchangeable bicycle components are readily available for bicycles having this overall configuration. However, the actual maneuverability, handling, and stability of the conventional bicycle leaves something to be desired.

In particular, the rear-wheel drive, front wheel steering arrangement of conventional bicycles makes the bicycle unstable in certain situations. For example, when the bicycle must stop suddenly to avoid an obstacle, the front wheel is charged with both steering the vehicle and providing the majority of the braking. Unfortunately the "tire patch" (that portion of the tire in contact with the road surface) has only a limited amount of frictional interaction with the road surface to accomplish both tasks. If the frictional "ability" of the tire patch is exceeded, the wheel may skid uncontrollably—resulting in a fall for the rider. This scenario is especially acute in a downhill, sudden-stop situation, and when traveling upon gravel, wet roads, or other less-than-favorable road surfaces.

In addition, the rear-wheel drive of conventional bicycles makes it difficult for the rider to overcome obstacles presented directly to the front tire. For example, rear wheel drive makes it especially difficult for the rider to travel up a curb or similar stationary object. Typically a rider is forced to "hop" the front wheel onto the curb, since even considerable pedaling and subsequent torque at the rear wheel will not cause the front wheel to climb the curb. However, such practice compromises the stability of the rider and could easily result in a fall. Even worse, many riders are forced to dismount their bicycle and lift it over or onto the obstacle before they can continue riding.

Despite these clear disadvantages, the fact remains that the familiarity of the bicycle—that is: it's seating position, pedaling angle, overall geometry, etc.—make it "here to stay". What is desirable is to provide a solution which overcomes many of the clear disadvantages of the conventional bicycle, while preserving its familiarity to billions of riders worldwide.

U.S. Pat. No. 316,047 to Marble describes an early attempt at providing front wheel drive in a two wheeled vehicle. However, Marble uses a large front wheel for both drive and steering.

U.S. Pat. No. 6,068,279 to Dion describes an attempt to provide two-wheel drive by driving the front wheel in addition to the rear wheel. However, Dion still attempts to provide steering using the front wheel.

While these units may be suitable for the particular purpose employed, or for general use, they would not be as suitable for the purposes of the present invention as disclosed hereafter.

SUMMARY OF THE INVENTION

It is an object of the invention to produce a bicycle which provides superior maneuverability, handling, and stability when compared to prior art bicycles. Accordingly, a front wheel drive, rear wheel steering bicycle is described herein.

It is another object of the invention to provide a bicycle which is familiar and comfortable to riders of conventional bicycles. Accordingly, conventional geometry, rider position and posture, pedaling distances and angles, as well as physical demands upon the rider are preserved while implementing the improvements of the present invention.

It is a further object of the invention to provide a bicycle which may be inexpensively manufactured. Accordingly, by maintaining much of the standard bicycle configuration, the present invention can be constructed using mostly off-the-shelf components.

It is a further object of the invention to provide a drive system which can be employed in all types of chain driven, two wheel vehicles. Accordingly, the present invention can be implemented using various familiar bicycle configurations such as touring, racing, and mountain bicycles, as well as motorized bicycles such as motorcycles and mopeds.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is a top plan view, with parts broken away, illustrating the steering cables, and their interconnection with the pulley assembly of the rear steering assembly.

FIG. 4 is a front elevational view of the front steering assembly, with parts broken away.

DETAILED DESCRIPTION OF THE PREFERRED EMBODIMENTS

Figure 1:
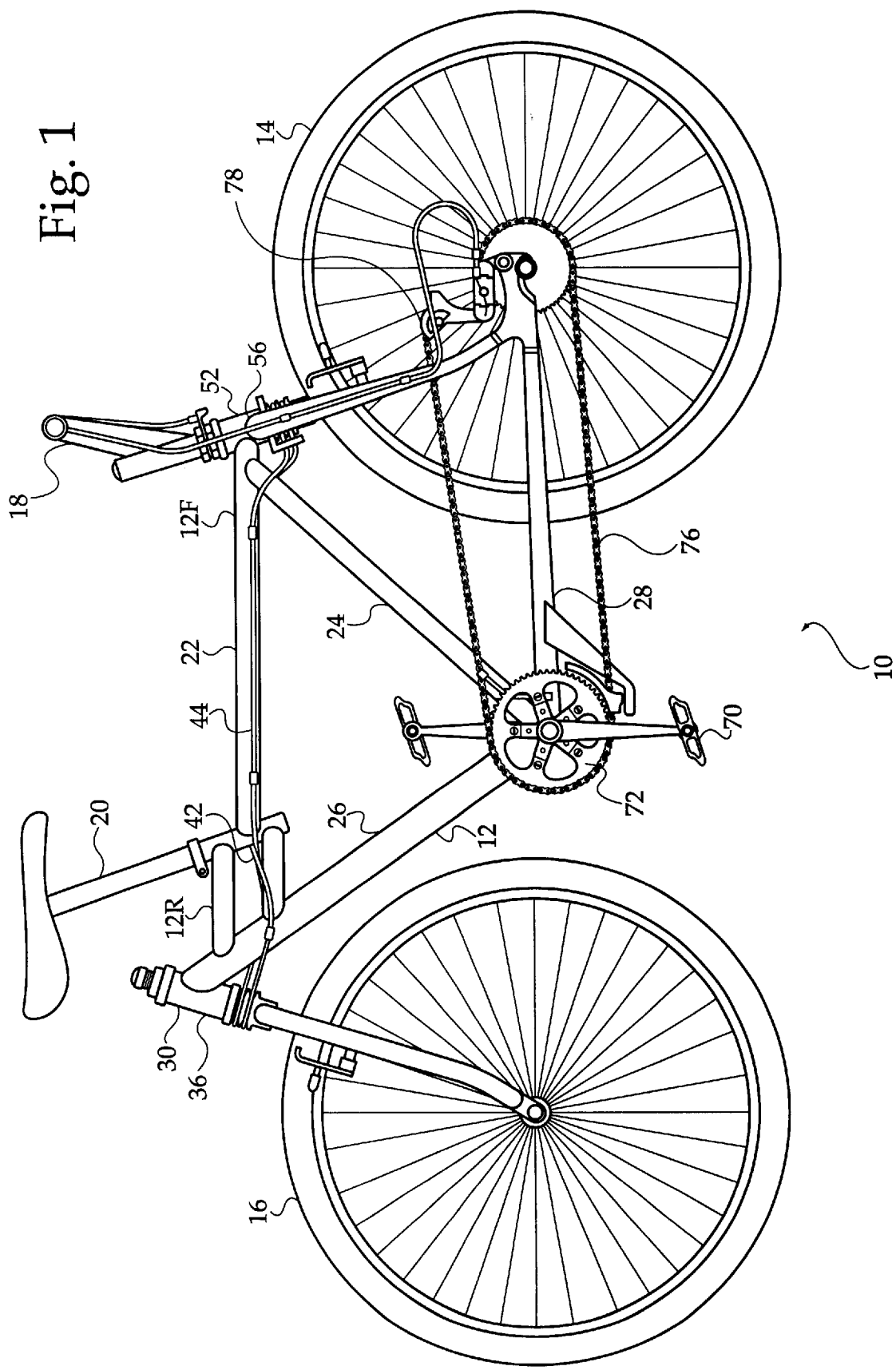
FIG. 1 is a side elevational view of a bicycle embodying the concepts of the present invention.

FIG. 1 illustrates a bicycle 10 according to the present invention. It should be noted at the onset that the novel concepts of the present invention are given meaning by the context of a familiar bicycle construction. The detailed illustration thereof, as provided herein, helps to give a workable example of the inventive concepts. However, the invention is not limited to the particular form illustrated, or to the particular bicycle configuration illustrated in the drawings and described herein.

Conventionally, the bicycle 10 includes a frame 12 having a front 12F and rear 12R, a front wheel 14, a rear wheel 16, handlebars 18 positioned directly above the front wheel 14, and a seat 20 attached to the frame 12 near the rear wheel 16. The frame 12 has a top tube 22, a forward tube 24, a rearward tube 26, and a lower tube 28.

In accordance with the principles of the present invention, the rear wheel 16 is attached to the frame 12 with a rear steering assembly 30. The rear steering assembly 30 includes a rear fork 32, within which the rear wheel 16 is mounted. The rear steering assembly 30 also includes a rear bearing sleeve 36, which facilitates pivot movement of the rear wheel 16.

Figure 2:
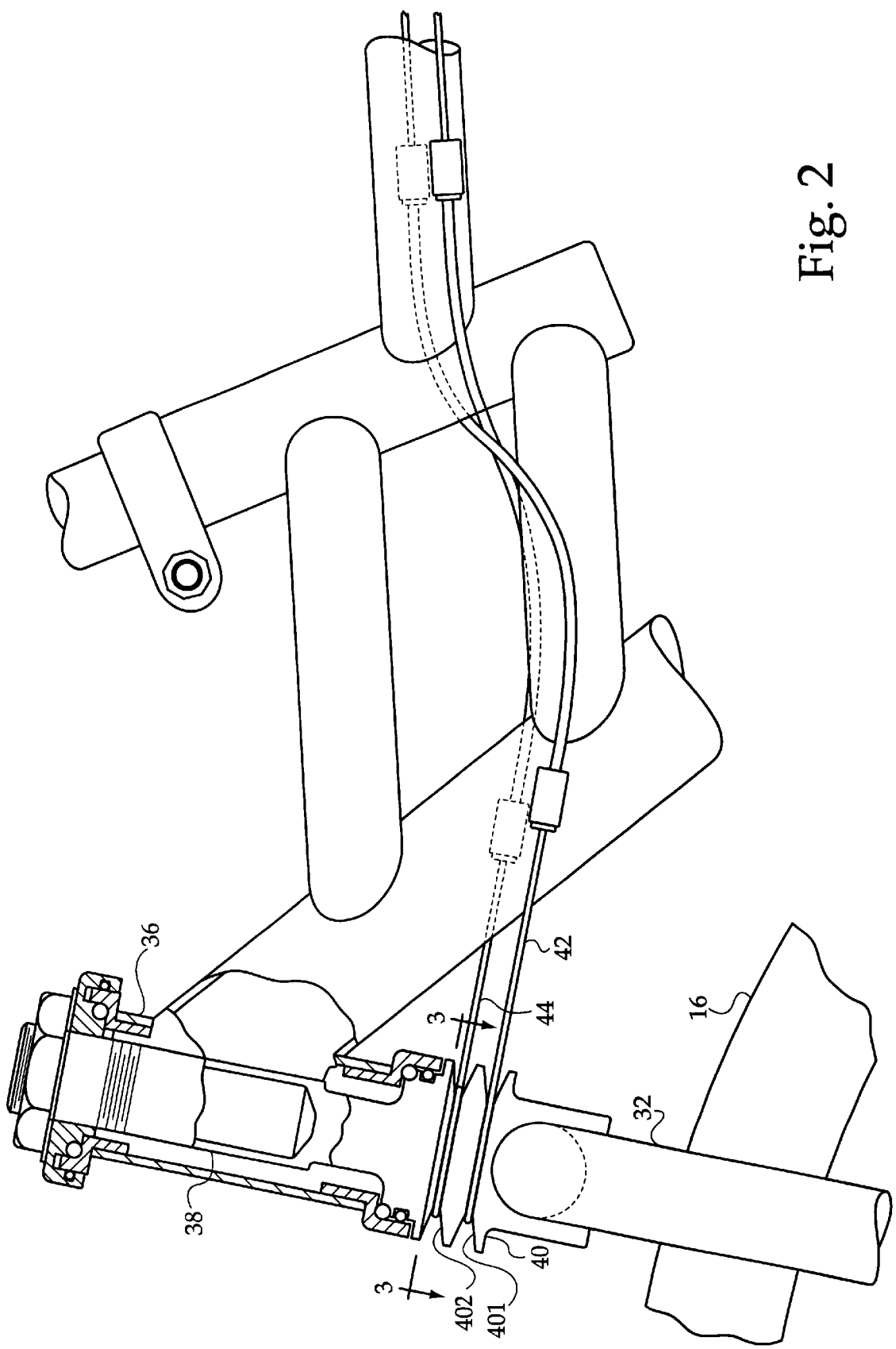
FIG. 2 is an enlarged side elevational view, illustrating a rear portion of the bicycle, wherein the rear steering assembly has been partially broken away to illustrate internal details thereof.

Referring to FIG. 2 for greater detail, the rear bearing sleeve 36 includes a rear bearing journal 38 which extends within the bearing sleeve 36 and allows rotary movement of the bearing journal 38 with respect to the bearing sleeve 36. In particular, the rear bearing journal 38 is rigidly connected to the rear fork 32 which thereby allows the rear wheel 16 to pivot while the bearing sleeve 36 remains stationary—fixed to the frame 12.

Actual manipulation of the rear bearing journal 38 may be accomplished with a rear pulley assembly 40, which preferably includes an first rear pulley 401 and a second rear pulley 402 coaxial therewith. The pulleys facilitate translation between linear and rotary forces, the purpose and applicability of which will be apparent hereinafter.

A left cable 42 and right cable 44 are each separately connected to the rear pulley assembly 40. As illustrated, the left cable 42 is connected to the first rear pulley 401, and the right cable 44 is connected to the second rear pulley 402.

Referring back again to FIG. 1, although the handlebars 18 appear to be physically connected to the front wheel 14, the front wheel is actually pivotally fixed, such that it is always aligned with the frame 12. In particular, the bicycle has a front steering assembly 50 (which does not steer the front wheel), that includes a front bearing sleeve 52, which is rigidly attached to the frame 12. The front wheel 14 is attached to the frame 12 with a front fork 56, which is itself rigidly attached to the front bearing sleeve 52.

Referring to FIG. 4, the front bearing sleeve 52 of the front steering assembly 50 is rigidly attached to the front fork 56. The front steering assembly 50 also includes a front bearing journal 54, which extends through the front bearing sleeve 52. The handlebars 18 are linked to the front bearing journal 54. In addition, a front pulley assembly 60 is also linked to the front bearing journal 54. Thus, the front pulley assembly 60 is rotatably connected to the handlebars 18 by the front bearing journal 54. Accordingly, the handlebars 18 can manipulate the front pulley assembly 58 without altering the pivotal position of the front fork 56 and thus the front wheel 14.

Figure 5:
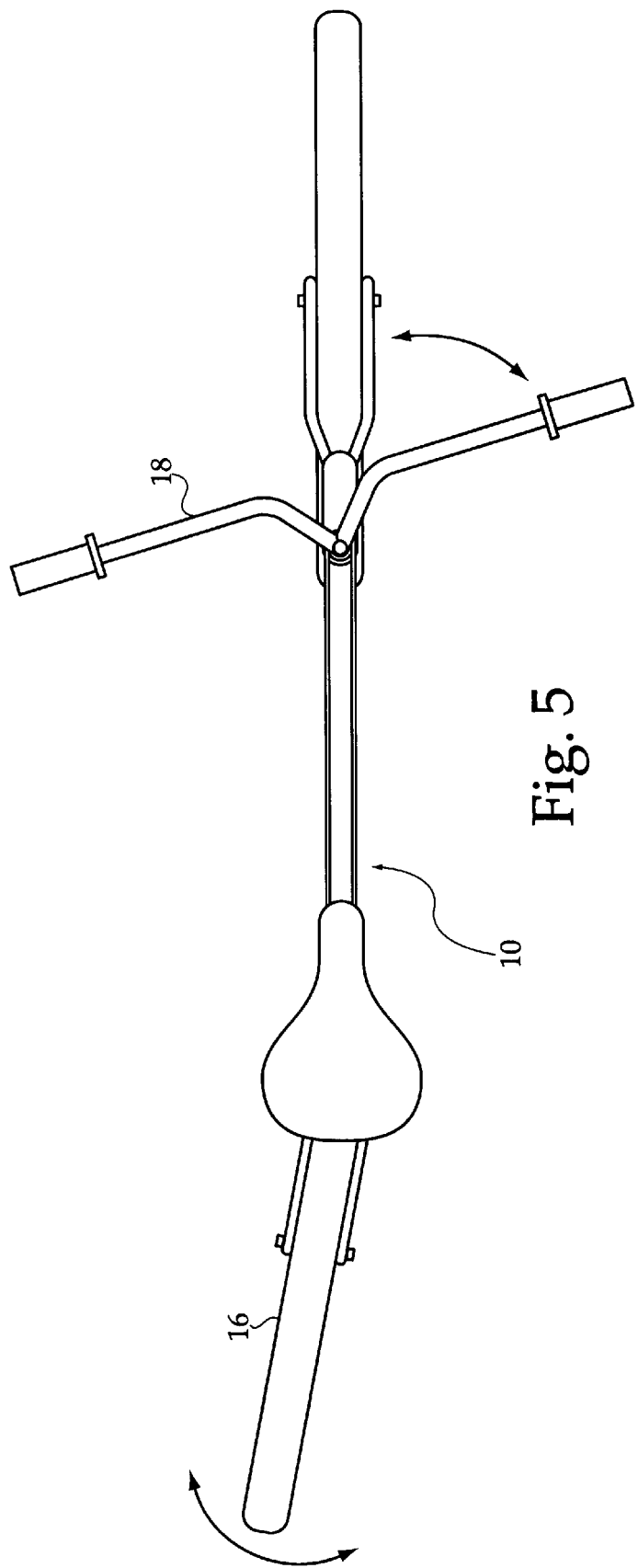
FIG. 5 is a top plan view of the bicycle, illustrating how the rear wheel pivots in response to movement of the handle bars.

FIG. 5 is a top plan view which illustrates steering of the bicycle 10. In order to steer the rear wheel 16, while operation of the bicycle 10 remains familiar and "natural" to the rider, it is necessary to pivot the rear wheel 16 in a direction opposite from that which the handlebars 18 is moved. So in FIG. 5, the rider is attempting to turn the bicycle to the left. To accomplish this left turn, the rear wheel 16 must also pivot to the left. However, axially, the handlebars 18 are turning counter-clockwise, while the rear wheel is turning clockwise.

Now then, to allow the rear wheel to be steered using the handle bars, it is necessary to provide a steering linkage to connect the front pulley assembly 60 and the rear pulley assembly 40, and that linkage must reverse the axial rotation between the handebars 18 and the rear wheel 16. The preferred linkage is the left cable 42 and right cable 44, which as previously discussed, are connected to the first rear pulley 401 and second rear pulley 402. However, referring to FIG. 4, the front pulley assembly 60 includes a first front pulley 601 and a second front pulley 602. The left cable 42 is attached to the first front pulley 601 and the right cable 44 is attached to the second front pulley 602. In this manner, the front and rear first pulleys 601 and 401 are linked by the left cable 42, and the front and rear second pulleys 602 and 402 are linked by the right cable 44. However, the cables are each wound in opposite directions on their respective pulleys.

To reiterate, as viewed from above, the left cable 42 is wound clockwise around the first rear pulley 401 and the first front pulley 601. Similarly, the right cable 44 is wound counter-clockwise around the second rear pulley 402 and the second front pulley 602. In this manner the rear wheel 16 will move contrary to the handlebars 17. For example, as the handlebar is rotated clockwise, it will "wind-up" the left cable 42 around thee first front pulley 601. The tensioned left cable 42 thereby in effect "unwinds" the cable around the first rear pulley 401 as it causes the rear wheel to pivot in the counter-clockwise direction.

It is also important to note that if the pulleys of the front and rear pulley assemblies are the same size, then a certain angular movement of the handlebar will impart a similar angular movement of the rear wheel. However, the relative angular movements of the handlebar and rear wheel can be adjusted by simply varying the pulley diameters.

To facilitate the desired direction of winding at the pulleys, and that each cable departs the pulley tangentially, the left cable 42 and right cable 44 must cross at some point between the front and back of the bicycle. Accordingly, referring to FIGS. 1, 2, and 3, while the left cable 42 and right cable 44 extend along the top tube 22 in an essentially straight line between the front and rear of the bicycle, they must cross somewhere therebetween. Illustrated in the drawings, the left cable 42 and right cable 44 cross near the seat 20. Illustrated in FIG. 3 a cross over region 46 is defined between ferrules 48. Within the crossover region 46, the left cable 42 and right cable 44 are each covered by a sheath 48, which facilitates the bend by the cable.

Now that the rear wheel steering has been described with sufficient detail to enable one of ordinary skill in the art to implement the same, attention is directed to the front wheel drive of the bicycle 10. Referring again to FIG. 1, pedals 70 are provided in a familiar position, where they are easily accessible to the rider when sitting upon the seat 20. The pedals 70 are linked to a drive sprocket 72. The pedals 70 are an example of a rotary power source which is linked to th drive sprocket 72. In the simplest context, the front wheel 14 has a driven sprocket 74 wherein the drive sprocket 72 is linked to the driven sprocket 74 by a chain 76. In a more complex context, a derailleur assembly 78 may be located at the front wheel to allow for multiple gear selection, such that the driven sprocket 74 would actually comprise several gears with various numbers of teeth. However, such variations are well within the scope of the inventive concepts described herein. In addition, the rotary power source connected to the drive sprocket 72 need not be human powered pedals, it may also be a motor or engine.

In conclusion, herein is presented a bicycle which provides front wheel drive and rear wheel steering, and thereby provides a bicycle which has superior handling, maneuverability and stability. As previously noted, the invention is illustrated in the drawings and in the foregoing description by example. As such illustrations are exemplative only, numerous variations may be made while adhering to the inventive concepts. Such variations are contemplated as being a part of the present invention.

What is claimed is:

1. A bicycle, using a rotary power source selected from human operated pedals and a motor, comprising:

a frame having a front and a rear;

handlebars pivotally mounted at the front of the frame;

a front wheel, the front wheel located at the front of the frame and having a driven sprocket;

a front steering assembly having a front fork which attaches the front wheel to the frame such that the front wheel is fixed in an aligned position with the frame, and having a front pulley assembly connected to the handlebars so that the pulley assembly rotates with the handlebars;

a rear wheel, the rear wheel mounted within a rear fork, the front wheel, rear wheel, and frame substantially inline;

a drive sprocket located between the front and rear of the frame, the drive sprocket in communication with the rotary power source;

a chain linking the drive sprocket and driven sprocket so that the front wheel is driven by the drive sprocket; and a steering linkage which connects the front pulley assembly to the rear wheel, such that when the handlebars are pivoted the rear wheel pivots to steer the bicycle.

2. The bicycle as recited in claim 1, wherein the steering linkage further comprises a rear steering assembly, the front steering assembly including a front bearing sleeve that is rigidly attached to the frame, a front bearing journal mounted within the front bearing sleeve for rotary motion, and the front pulley assembly connected to the front bearing journal, wherein the handlebars are connected to the front bearing journal such that rotation of the handlebars causes rotation of the front pulley assembly.

3. The bicycle as recited in claim 2, wherein the rear steering assembly further comprises a rear bearing sleeve that is rigidly attached to the frame, a rear bearing journal mounted within the rear bearing sleeve for rotary motion, and a rear pulley assembly connected to the rear bearing journal, wherein the rear fork is connected to the rear bearing journal such that rotation of the rear pulley assembly causes rotation of the rear fork.

4. The bicycle as recited in claim 3, wherein front pulley assembly and rear pulley assembly are linked by at least one cable.

5. The bicycle as recited in claim 4, wherein the front pulley assembly comprises a front first pulley and a front second pulley coaxial therewith, the rear pulley assembly comprises a rear first pulley and a rear second pulley coaxial therewith, wherein the at least one cable further comprises a left cable and a right cable, wherein the front first pulley is connected to the rear first pulley by the left cable, and wherein the front second pulley is connected to the rear second pulley by the right cable.

6. The bicycle as recited in claim 5, wherein the left cable and right cable cross between the front and rear of the bicycle.

7. A bicycle, comprising:

a frame having a front and rear;

a front wheel located at the front of the frame;

a rear wheel located at the rear of the frame, the front wheel and rear wheel substantially the same in size;

handlebars, pivotally mounted at the front of the frame;

a front steering assembly, having a front fork which attaches the front wheel to the frame such that the front wheel is fixed in an aligned position with the frame, and having a front pulley assembly connected to the handlebars so that the pulley assembly rotates with the handlebars;

a rear steering assembly, having a rear pulley assembly and a rear fork which attaches the rear wheel to the frame, the rear pulley assembly is connected to the rear fork so that when the rear pulley assembly rotates, the rear wheel pivots; and a linkage between the front pulley assembly and rear pulley assembly to cause rotation of the rear pulley assembly when the front pulley assembly rotates so that the rear wheel pivots when the handlebars are pivoted.

8. The bicycle as recited in claim 7, wherein the linkage between the front pulley assembly and rear pulley assembly comprises at least one cable.

9. The bicycle as recited in claim 8, wherein the front pulley assembly has a front first pulley and a front second pulley, wherein the rear pulley assembly has a rear first pulley and a rear second pulley, and wherein the linkage comprises a left cable and a right cable, such that the left cable connects the front first pulley and rear first pulley, and the right cable connects the front second pulley and rear second pulley.

10. The bicycle as recited in claim 9, wherein, as viewed from above, the left cable is wound clockwise around both the front first pulley and rear first pulley, and the right cable is wound counter-clockwise around both the front second pulley and rear second pulley.

11. The bicycle as recited in claim 10, wherein the left cable and right cable cross at a crossover region located between the front wheel and rear wheel.

12. The bicycle as recited in claim 11, further comprising a drive sprocket, located between the front and rear wheels, a driven sprocket, located on the front wheel, and a chain connecting the drive sprocket and driven sprocket so that the front wheel is powered by a rotary power source at the drive sprocket.

13. The bicycle as recited in claim 12, wherein the rotary power source is selected from human powered pedals, a motor, and an engine.

* * * * *